United States Patent [19]

Van Wyk et al.

[11] 4,433,621

[45] Feb. 28, 1984

[54] APPARATUS FOR BRANDING MEAT OR MEAT PRODUCTS

[75] Inventors: Richard Van Wyk, Darien; James Eisenberg, Highland Park, both of Ill.

[73] Assignee: Vienna Sausage Manufacturing Company, Chicago, Ill.

[21] Appl. No.: 327,284

[22] Filed: Dec. 4, 1981

[51] Int. Cl.³ .................. B41F 17/20; A22C 17/10
[52] U.S. Cl. ................................ 101/11; 101/31; 101/32; 99/388; 426/383
[58] Field of Search .................. 101/9-11, 101/25, 27, 31, 32, 35, 44; 426/87, 105, 383; 99/388

[56] References Cited

U.S. PATENT DOCUMENTS

| 175,556 | 9/1955 | Krone . | |
|---|---|---|---|
| 653,915 | 7/1900 | Kinyon | 101/11 |
| 762,679 | 6/1904 | Bing | 101/11 |
| 779,810 | 1/1905 | Sprecher . | |
| 794,440 | 7/1905 | Wirth | 101/11 |
| 1,676,111 | 7/1928 | Reiber | 101/25 X |
| 1,995,725 | 3/1935 | Wrappler . | |
| 2,040,525 | 5/1936 | Mumma et al. | 101/27 X |
| 2,622,513 | 12/1952 | Rinehart et al. . | |
| 3,026,792 | 3/1962 | Miskel et al. | 101/11 |
| 3,299,804 | 1/1967 | Schueler | 101/35 |
| 3,359,891 | 12/1967 | Price, Jr. | 101/35 |
| 3,393,294 | 7/1968 | Cramer | 101/9 X |
| 3,641,930 | 2/1972 | Riddington | 101/35 |
| 4,089,260 | 5/1978 | Brown et al. . | |
| 4,297,942 | 11/1981 | Benson et al. | 99/388 X |

FOREIGN PATENT DOCUMENTS 67169 7/1948 Denmark .................. 101/9

Primary Examiner—Clifford D. Crowder
Attorney, Agent, or Firm—Neuman, Williams, Anderson & Olson

[57] ABSTRACT

An apparatus is provided for affixing a brand on the surface of a plurality of meat products. A first conveyor moves the meat products through a branding zone where they are contacted by heated brands affixed to a second conveyor which travels at the same rate as the first conveyor.

13 Claims, 6 Drawing Figures

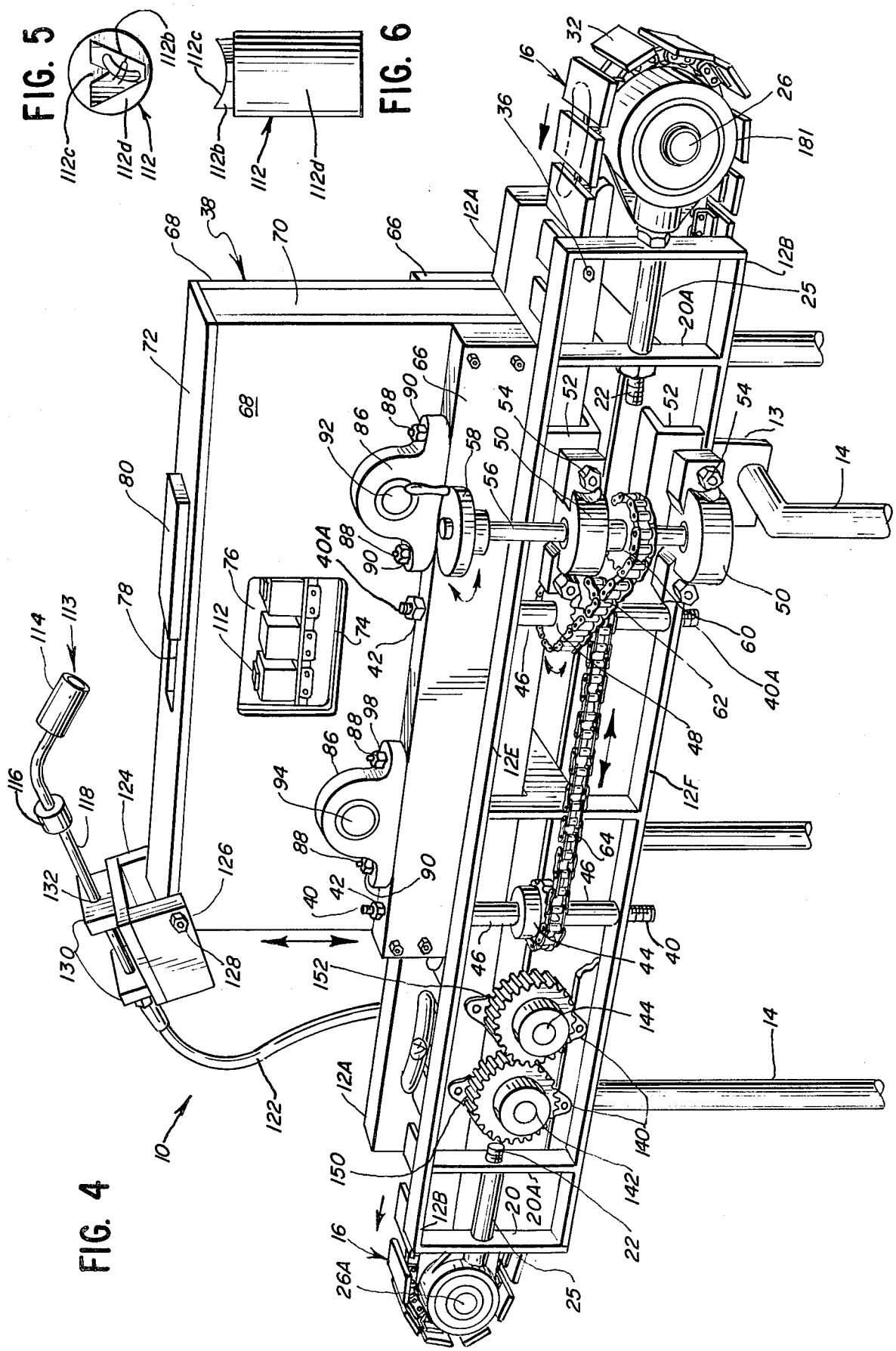

APPARATUS FOR BRANDING MEAT OR MEAT PRODUCTS

BACKGROUND OF THE INVENTION

1. Field of the Invention

The present invention relates to an apparatus or machine for affixing a brand upon meat or meat products, especially processed meat products such as frankfurters or other sausages, by bringing a heated brand surface into contact with the surface of the meat or meat product.

2. Description of the Prior Art

The marking of meat or meat products having a smooth surface such as sausages or frankfurters (hereinafter referred to simply as meat products) by the affixation of a brand can serve one or more of a number of purposes. The placing of a mark upon a meat product may, for example, serve to identify the origin of the product, to identify the producer of the product, or to indicate a grade or other classification of the product. By far the most important of these purposes is the use of such a brand to affix upon the meat product the trademark of the producer.

In order to adequately perform the function of affixing a trademark or other brand upon a meat product, the apparatus or machine used for applying the brand should be capable of branding a large number of such products in a relatively short time. Specifically, such a branding machine(s) must be able to mark as many meat products in a given time period as are produced in a given period without damage to the meat in order to be commercially useful.

Moreoover, the apparatus must bring the heated brand surface into contact with the smooth surface of the meat product, such as a sausage, and maintain that contact for a period of time sufficient to affix a legible brand upon that surface. This it must do without undue burning or scorching of the meat product.

Another desirable feature of such a branding apparatus is the ability to affix brands upon meat products of various widths and thicknesses while maintaining the legibility of the brands.

Reinhart et al., U.S. Pat. No. 2,622,513, discloses a method of branding fresh liver by the use of a hand-held branding apparatus comprising a plurality of brands which are mounted upon a hollow cylinder and which are heated electrically. This device, while capable of affixing multiple brands upon a single, relatively flat surface, is neither capable of sequentially affixing a brand upon a large number of individual meat products during a short time span nor useful for branding small meat products having substantially rounded surfaces, such as sausages.

Brown et al., U.S. Pat. No. 4,089,260, discloses a meat patty finishing cooker comprising conveyor means and a plurality of hot-air jets for producing browned or seared marks or stripes so as to give the appearance that the patty was grilled. While this apparatus is capable of cooking a large number of meat patties in assembly-line fashion, its forced hot-air heating elements are not suited for the affixing of brands upon meat products for two reasons. First, because of the intense heat of the hot-air jets which is necessary to produce the desired appearance, not only is the meat patty marked, but, as Brown et al explain, it is partially cooked as well. Indeed, one suggested application of the Brown et al. device is to provide means for general surface cooking. In many applications of the apparatus of the instant invention, either limited or general surface cooking associated with the marking process would be highly undesirable. This is particularly true in the case of the use of a branding apparatus to mark fresh, processed or partially cooked meat products which are not produced for immediate consumption. The second disadvantage of the Brown et al. meat patty cooker is that it is incapable of producing a distinct, discrete, legible mark upon the meat surface.

In summary, the devices of the prior art are not satisfactory for affixing a single distinct brand upon large numbers of processed meat products, such as frankfurters and sausages having smooth surfaces, of varied shape and thickness, as is required of an apparatus to be employed in a large-scale commercial meat product processing operation.

SUMMARY OF THE INVENTION

In one broad form the present invention is an apparatus, or machine, for affixing a brand on the surface of a plurality of prepared meat products which comprises:

(a) a first driven conveyor means having an endless belt with a surface portion disposed to support a plurality of aligned spaced meat products whle the latter pass through a branding zone;

(b) a second belt conveyor means disposed in the branding zone in substantially overlying opposed relation to a portion of the upper surface of said first conveyor means; the second conveyor means has a plurality of spaced branding elements affixed to the outer surface thereof and wherein a portion of said outer surface and the branding elements travel as a unit in parallel spaced relation with respect to the upper surface of said first conveyor means to provide contact of the branding elements with the surface of corresponding meat products carried by said first conveyor means;

(c) means for heating said branding elements to a predetermined branding temperature; and (d) means for coordinating the rate of travel of said first and second conveyor means.

The first driven, endless belt conveyor means is supported by a frame and is suitable for moving a number of meat products through a branding zone. Adjustable guide means are associated with the belt conveyor so that, by adjustment of the spacing between the guide means, a laterally confined path is defined on the surface of the first conveyor which is substantially commensurate with the width of the meat product to be branded and carried on the upper surface of the conveyor.

The second conveyor means is supported in a second frame adjustably positioned on the first frame and has a plurality of branding elements attached thereto. It is positioned relative to the first conveyor means so that each meat product is contacted by at least one branding element as it moves through the branding zone, thereby affixing at least one brand upon each meat product.

Each branding element is formed of heat conducting metal, such as steel or iron, and includes a discrete support and brand indicia provided on one surface of the support. The support surface is preferably contoured to conform to the surface configuration of the meat product to be branded.

The branding element support has sides disposed substantially transverse to the direction of movement of the second conveyor means. Each side is provided with a guide channel disposed substantially parallel to the direction of movement of the second conveyor means.

A protective, insulated metal safety shroud is provided which encloses both the second conveyor means and the branding zone. The top of the shroud has an aperture through which a heating means is inserted. A window is provided in each side of the shroud for observation and monitoring the heating of the branding elements by the heating means. Instruments may be used to monitor temperature.

The brand heating means in one embodiment includes a torch for heating the brand indicia and associated support means to a temperature sufficient to affix a brand upon the surface of a meat product when contacted thereby.

The protective shroud of the machine also has guide means, affixed to the interior sides of said shroud, for slidably engaging the side channels of the branding element support, thereby guiding the latter through the branding zone. When the guide means engage the channels of the brand support means, the branding element is held at a fixed height relative to the upper surface of the first conveyor means as it travels through the branding zone, thus permitting contact pressure to be exerted by the heated brand indicia on the exterior surface of meat products.

Means for adjusting the height of the second conveyor means relative to the first conveyor means are provided whereby meat products of different thicknesses may travel through the branding zone and be contacted by the branding elements for a sufficient time to affix at least one brand upon each meat product without deleteriously affecting the latter. Thus, it is one object of the invention to provide an apparatus for branding a large number of uniform processed meat products in a given time period.

A further object of the invention is to provide an apparatus for affixing at least one discrete, legible brand upon each siuch meat product.

An additional object is to provide an apparatus having means for adjusting the height and width of the path along which said meat products travel so as to permit the branding of meat products of varying size, shape and thickness.

Other objects and advantages of the invention will become apparent from the following detailed description and claims and from the accompanying drawings.

DESCRIPTION OF THE DRAWINGS

FIG. 4 is a fragmentary rear perspective view of the apparatus of FIG. 1.

FIG. 5 is an enlarged end view of a typical branding element.

FIG. 6 is an enlarged side view of the branding element of FIG. 5.

DETAILED DESCRIPTION

Figure 1:
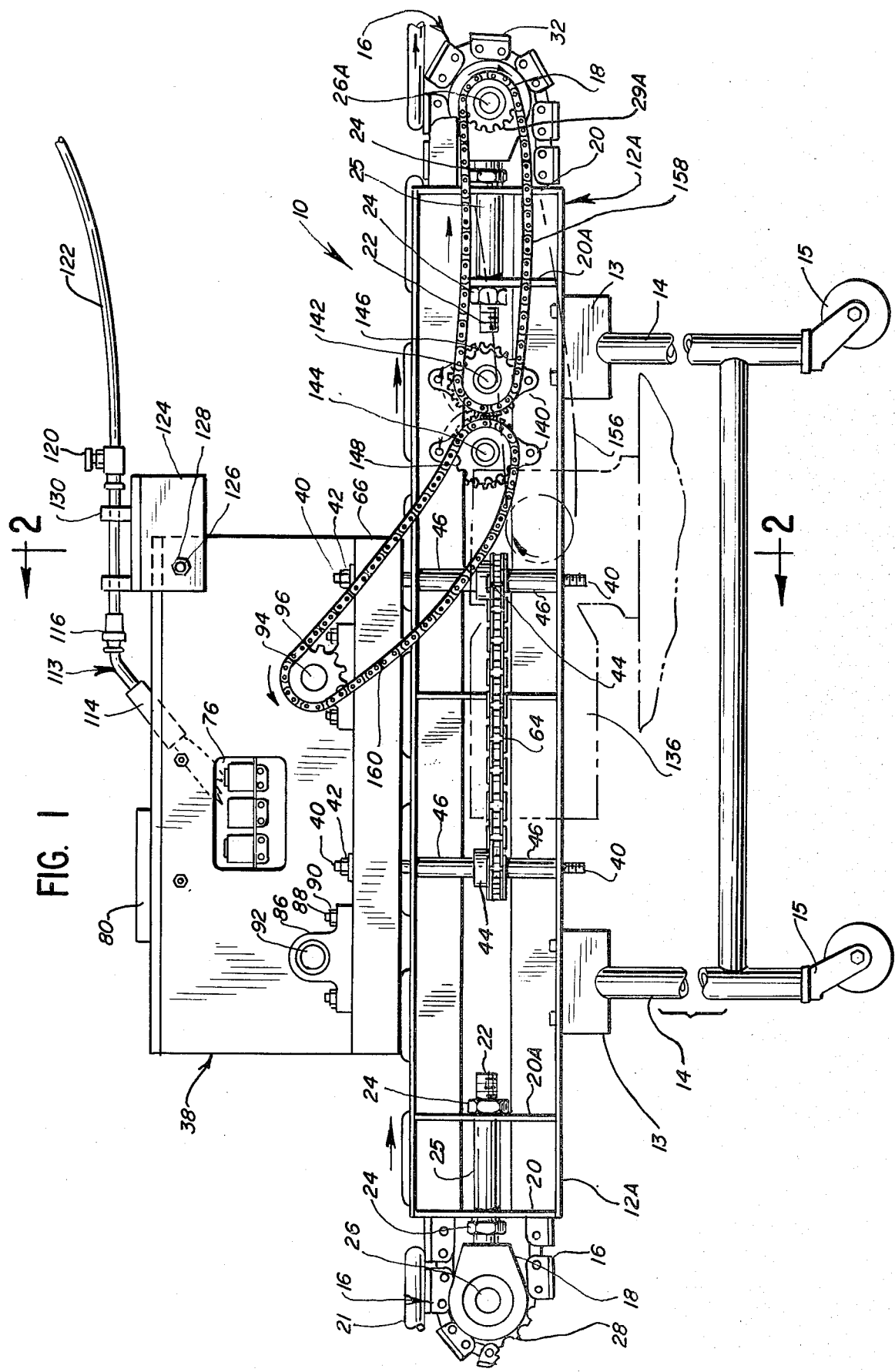
FIG. 1 is a side-elevation view of one embodiment of the improved branding apparatus showing various drive assemblies for operating the lower conveyor.

Referring to FIGS. 1 and 4, a preferred embodiment of the improved branding apparatus 10 is shown, which includes a frame having a pair of spaced upright, elongated front and rear members 12A, 12B. The members are secured together by supporting crosspieces 13. The members and crosspieces are supported by a plurality of legs 14. The lower ends of the legs may have wheels or rollers 15 attached thereto to provide movability of the apparatus within a given area.

A first, or lower, conveyor 16 is an endless belt disposed between frame members 12A and 12B, and slidably supported on bars 37 extending transversely inwardly from the inside of frame members 12A and 12B. The opposite ends of the belt are engaged by suitable sprockets 28, 29A mounted on shafts 26 and 26A, the latter being disposed between pairs of adjustable take-ups 18 provided at each end 20 of the frame member 12A. The take-ups as seen in FIG. 4, include bolts 22 secured to portions 20A of the frame member by nuts 24 and sleeves 25. Shaft 26A extends outwardly from takeup 18 and has mounted thereon a double-width roller chain sprocket 29A. The conveyor belt, as illustrated, is a flat-top chain 32 having spacer rollers 33 (see FIG. 2) which engage the peripheries of sprockets 28 and 29A. The support bars 37 subtend and support the upper run of conveyor 16 as it transports meat products between the frame members 12A, 12B in the direction of the arrows.

Also mounted upon frame 12 are two adjustable guides 34, which are attached to frame members 12A and 12B by bolts 35 and nuts 36. The guides 34 coact to provide or define a narrow path traversed by the meat products as the upper run of the conveyor moves between the frame members. The spacing between the guides approximates the width of the individual meat products, see FIGS. 2 and 4.

Figure 2:
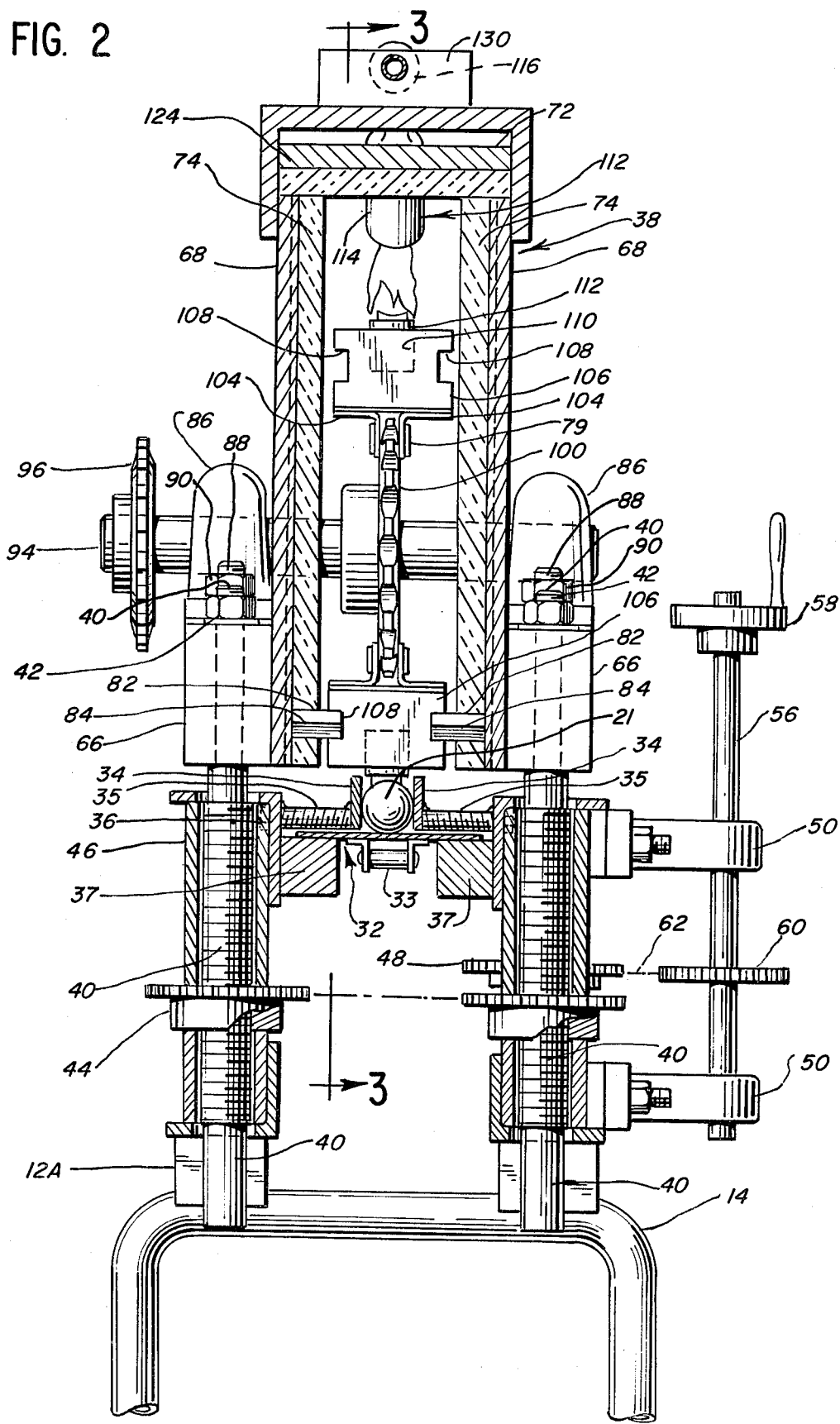
FIG. 2 is an enlarged sectional view taken across line 2—2 of FIG. 1.

Mounted upon the top of frame 12 is shroud 38 which encloses the branding zone of the apparatus and supports the upper branding means conveyor, as will be described more fully hereinafter. Shroud 38 is supported by and mounted on frame 12 by a plurality of bolts 40 and 40A and nuts 42. Engaging the threaded portion of the three bolts 40 at their approximate midpoints are three roller-chain sprockets 44 which are held in position relative to frame 12 by spacer sleeves 46, as can be seen in FIGS. 1, 2 and 4. Engaging bolt 40A at its approximate midpoint is double width roller-chain sprocket 48, see FIGS. 2 and 4, which is also held in position relative to frame 12 by spacer sleeves 46.

Adjacent to sprocket 48 are pillow blocks or bearings 50 which are fastened to the upper end lower frame sections 12E and 12F, respectively by brackets 52 and attaching bolts 54. Supported by pillow blocks 50 is a vertically disposed control shaft 56 to the upper end of which is attached a manual crank handle 58. Also attached to shaft 56 and positioned adjacent to and below block 50 is a roller-chain sprocket 60. Linking sprocket 60 to the upper row of teeth of double width sprocket 48 is first roller chain loop 62. Second roller chain loop 64, in turn, links the lower row of teeth of sprocket 48 with sprockets 44. As a result of this arrangement, when the crank 58 is turned, sprocket 60, sprocket 48 and sprockets 44 all rotate in unison. Inasmuch as sprockets 44 and 48 are fixed in position relative to frame sections 12 by sleeves 46, the rotation of those four sprockets upon the threads of bolts 40 and 40A cause said bolts to move in unison upward or downward, depending upon the direction of rotation of crank 58. Since shroud 38 is secured to each of bolts 40 and 40A, and since the upper conveyor (described in detail below) is, in turn, supported by said shroud 38, the rotation of said crank 58 results in the upward or downward movement of the upper conveyor relative to frame 12 and relative to the lower conveyor mounted thereon.

As is shown in FIGS. 2 and 4, shroud 38 comprises a pair of support bars 66 which are attached to bolts 40 and 40A by nuts 42. The shroud also includes upwardly extending spaced parallel side panels 68, end panels 70 and a top panel 72. Applied to the interior surfaces of side panels 68, end panels 70 and top panel 72 is an insulating sheeting 74, see FIGS. 3 and 4. Each side panel 68 is provided with a window 76 for permitting the machine operator to view the upper run of the upper conveyor 79. Top 72 also has an aperture 78 for access to the upper run. An additional insulating block 80 is mounted on the exposed surface of the top surface to one side of aperture 78. The function of block 80 will become apparent from the description to follow.

Figure 3:
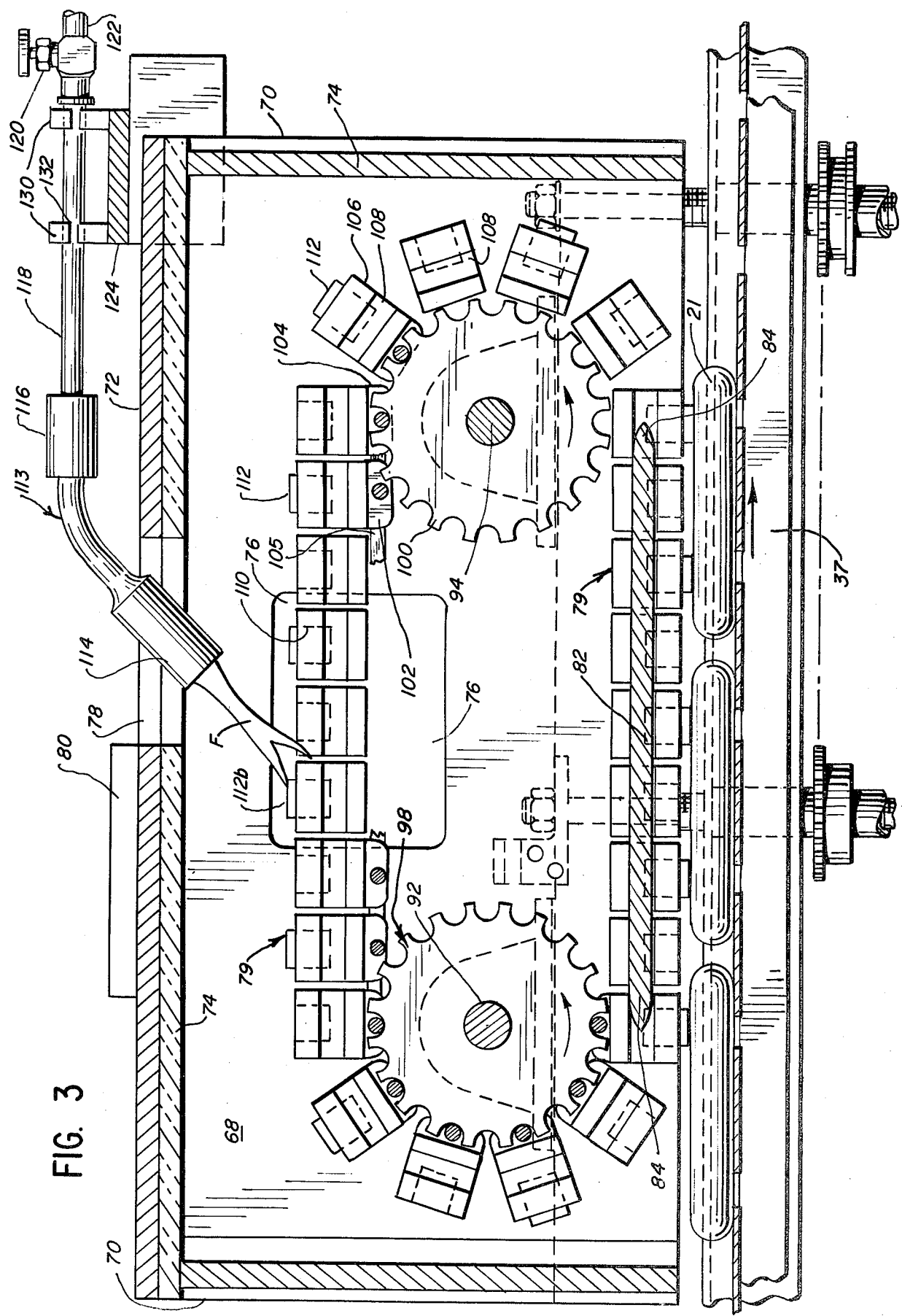
FIG. 3 is an enlarged fragmentary sectional view taken along the line 3—3 of FIG. 2.

As shown in FIGS. 2 and 3, elongated conveyor guide rails 82 are mounted on and project inwardly from the lower portions of side panels 68. The ends 84 of each rail are tapered as seen more clearly in FIG. 3. Two of the four pillow blocks 86 are mounted upon the upper surface of each support bar 66 and are secured thereto by bolts 88 and nuts 90. Corresponding pillow blocks 86 are disposed in transverse alignment and carry a shaft 92, 94, which passes through the side panels 68 and support sprockets 98, 100 for the upper conveyor. Shaft 94 extends outwardly from block 86 and has keyed thereto roller-chain sprocket 96, see FIG. 1.

Engaging sprockets 98 and 100 is an endless roller chain 102 having dogs 104 attached to the chain links. Carried by dogs 104 are brand support blocks 106 having exposed side channels 108 formed on the exterior thereof. The channels are for engaging sized to accommodate the guide rails 82 as each block moves from sprocket 98 to sprocket 100, see FIG. 3. Each block is provided with a socket 110 which is adapted to snugly receive a branding element 112, as shown in FIG. 3. If desired, only selected blocks 106 would carry the branding elements.

Each branding element 112, as seen in FIGS. 5, 6 includes a base section 112d which is in a snug sliding fit within the block socket 110. One end of the base section 112a has formed thereon a brand indicia 112b which protrudes from the end of the socket 110, see FIG. 3. The surface 112c of the brand indicia 112b is preferably contoured to the surface of the meat product to receive the brand mark, see FIG. 6.

Depicted in FIGS. 1, 3 and 4 is a heating element 113 (e.g., torch) for heating the brand indicia 112b. The torch 113 includes a flame nozzle 114 having fitting 116 for attaching to a feed tube 118. Disposed within tube and upstream of the fitting is a control valve 120 connected to an appropriate gas supply by a suitable hose section 122. The torch 113 is secured to shroud 38 by a suitable bracket 124. The bracket 124 in the illustrated embodiment is pivotally connected to shroud 38 by bolts 126 and nut 128. Bracket 124 has a pair of connected flanges 130, each of which has an aperture 132 through which the feed tube 118 extends.

In operation, the torch, when ignited, is pivoted so that the nozzle 114 extends through the aperture 78 formed in the shroud top panel and into the interior of the shroud. The flame F emitted from the nozzle is directed onto the brand indicia 112b as each branding element 112 moves beneath the nozzle and through the branding zone. Once the branding indicia is heated, the element 112 will move around sprocket 98 and into branding contact with a meat product as the latter moves between guides 34. The branding element 112 will remain in branding contact with the meat product as it moves between the guides 34 for a distance substantially equal to the spacing between the shafts 92, 94. A suitable power source 136 for driving both conveyors 16, 79 is shown in phantom lines in FIG. 1. Mounted upon frame 12 between shaft 94 and shaft 26A (FIGS. 1 and 4) are four bearings 140, two of which are mounted upon each side frame 12. Supported by bearings 140 are shafts 142 and 144 which pass through the lower conveyor chain loop. On the exposed ends of the shafts 142 and 144 are chain sprockets 146 and 148. On the opposite ends of shafts 142 and 144 (FIG. 4) are fitted intermeshing drive gears 150 and 152.

Power is transmitted from the power source 136 to the upper and lower conveyors 79, 16 by a chain 156 (shown in phantom form in FIG. 1) which couples the output of power source 136 to sprocket 29A by engaging the outer row of teeth thereof. An additional roller chain loop 158 couples the other (inner) teeth of sprocket 29A to sprocket 146. Further transmission of power from sprocket 146 to sprocket 144 occurs by the engagement of the teeth of drive gear 150 with those of drive gear 152 (FIG. 4), inasmuch as sprocket 146 and gear 150 are mounted upon a single shaft 142, while sprocket 146 and gear 152 are mounted upon shaft 144. Chain 160 completes the series of drive couplings by engaging the teeth of sprockets 148, 96, thus driving shaft 94 of the upper conveyor 79.

In operation, the meat products, such as sausages or frankfurters 21, are introduced onto one end of the lower conveyor 16. A confined path is provided by adjustment of the guides 34, disposed over the conveyor belt 16, so that the meat products are arranged in end to end relation as they travel between the guides and under the branding elements carried by the upper conveyor 79.

The contact pressure of the branding elements 112 on the meat products is controlled by adjustment of the bolts 40 and 40A through manual crank wheel 58.

The rate of travel of the first conveyor 16, and the second conveyor 79 is coordinated by interlinked chain belt 160. A variable speed motor or other power source controls the time of branding contact. Generally, a branding contact speed of the conveyors 16, 79 of about one second is satisfactory.

We claim:
1. An apparatus for affixing a brand on the surface of a plurality of meat products comprising:
  (a) a first conveyor means having a surface portion for supporting and moving a plurality of relatively spaced meat products through a branding zone;
  (b) a second conveyor means disposed in the branding zone and having a portion thereof in substantially opposed overlying relation to the surface portion of said first conveyor means, said second conveyor means including a plurality of relatively spaced branding elements mounted thereon, each of said branding elements being removably accommodated in a socket-like support means, thereby causing said branding elements to travel through the branding zone while in spaced substantially parallel relation to the product-supporting surface portion of said first conveyor means and causing said branding elements to continuously contact the product for the period of time the product travels through the branding zone;

(c) means for heating said branding elements to branding temperatures prior to same contacting the meat products in said branding zone;

(d) means for coordinatingly driving said first and second conveyor means.

2. An apparatus according to claim 1 wherein said first conveyor means comprises a flat-top chain.

3. An apparatus according to claim 1 wherein said first conveyor means includes adjustable orienting guide means disposed above the surface portion of said first conveyor means in the branding zone.

4. An apparatus according to claim 1 wherein said second conveyor means includes means for vertically adjusting the spacing between said surface portion of said first conveyor means and said portion of said second conveyor means which is in substantially opposed overlying relation thereto.

5. An apparatus according to claim 1 wherein each of said branding elements has an exposed surface contoured to complement the surface of the product to be branded.

6. An apparatus according to claim 1 wherein the branding element heating means includes a torch having an open flame in heating contact with the branding indicia prior to the latter entering the branding zone.

7. An apparatus according to claim 1 wherein said first and second conveyor means are supported by a frame and are substantially enclosed within a shroud for protecting an operator and for defining the branding zone.

8. An apparatus according to claim 7 wherein said protective shroud comprises an enclosure having side, end and top panels, said top panel having an aperture formed therein for permitting the pivotal insertion and removal of the heating means into the branding zone, and at least one of said side panels having a window formed therein for visual inspection by an operator of the heating of said branding means by said heating means.

9. An apparatus according to claim 8 wherein the shroud panels have an insulating material affixed to the interior surfaces thereof.

10. An apparatus according to claim 1 wherein the heating means is pivotally mounted with respect to said second conveyor means.

11. An apparatus for affixing a brand on the surface of a plurality of meat products comprising:
(a) a first conveyor means having a surface portion for supporting and moving a plurality of relatively spaced meat products through a branding zone;
(b) a second conveyor means disposed in the branding zone and having a portion thereof in substantially opposed overlying relation with the surface portion of said first conveyor means, said second conveyor means including a plurality of relatively spaced branding elements mounted thereon, each of said branding elements being removably accommodated in a socket-like support means, thereby causing said branding elements to travel through the branding zone while in spaced substantially parallel relation with the product-supporting surface portion of said first conveyor means, wherein each of said socket-like branding element support means includes sides thereof provided with a first complemental guide unit which co-acts with a fixed second complemental guide unit thereby effecting movement of said socket-like member along a path essentially parallel to, and a predetermined distance from, said first conveyor means throughout the length of travel of said socket-like member through the branding zone;
(c) means for heating said branding elements to branding temperatures prior to same contacting the meat products in said branding zone;
(d) means for coordinatingly driving said first and second conveyor means.

12. An apparatus according to claim 11 wherein one of the complemental guide units is an elongated recess and the other complemental guide unit is an elongated protuberance for slidably engaging said recess.

13. An apparatus having a branding zone for affixing a brand upon the surface of a plurality of meat products comprising:
(a) a frame which includes a pair of elongated spaced upright parallel members;
(b) first flat-top chain conveyor means having a surface portion for supporting and moving meat products through said branding zone disposed between said frame members;
(c) adjustable guide means positioned above said conveyor surface portion for defining a laterally confined path for said meat products;
(d) second conveyor means disposed in the branding zone, including a plurality of branding elements which define the outer surface thereof, said second conveyor means being adjustably positioned in substantially opposed, overlying relation to the surface portion of the first conveyor means and being spaced therefrom so as to permit at least one of said branding elements to contact and brand the surface of a meat product which moves through said branding zone while supported on the surface portion of said first conveyor;
(e) means carried by the second conveyor for affixing a brand upon a meat product as it moves through said branding zone, said branding means including a brand support having sides provided with a first complemental guide unit and having a removable brand element which includes a branding indicia having a surface contoured to conform to the shape of a meat product when in branding contact therewith;
(f) a second complemental guide unit affixed to the second frame for slidably engaging said first complemental guide unit of said brand support means for effecting movement of said brand support means along a predetermined path through the branding zone;
(g) a protective shroud mounted on said second frame for enclosing said conveyor means and said branding zone, said shroud having side, top and end panels including an insulating material affixed to the interior surfaces thereof, having a window formed in at least one side panel for permitting a machine operator to view the heating of said branding means by a torch, and having an aperture formed in the top panel for insertion of a torch into said branding zone;
(h) a pivotally-mounted torch affixed to said shroud for heating the branding indicia to a temperature sufficient to brand the surface of a meat product; and,
(i) means for coordinatingly driving said first and second conveyor means.

* * * * *